(12) United States Patent
Kojima

(10) Patent No.: US 11,951,521 B2
(45) Date of Patent: Apr. 9, 2024

(54) METHOD OF MANUFACTURING CONNECTION MEMBER

(71) Applicant: AISIN TAKAOKA CO., LTD., Toyota (JP)

(72) Inventor: Toru Kojima, Toyota (JP)

(73) Assignee: AISIN TAKAOKA CO., LTD., Toyota (JP)

( * ) Notice: Subject to any disclaimer, the term of this patent is extended or adjusted under 35 U.S.C. 154(b) by 571 days.

(21) Appl. No.: 17/272,042

(22) PCT Filed: Sep. 13, 2019

(86) PCT No.: PCT/JP2019/036228
§ 371 (c)(1),
(2) Date: Feb. 26, 2021

(87) PCT Pub. No.: WO2020/066721
PCT Pub. Date: Apr. 2, 2020

(65) Prior Publication Data
US 2021/0346931 A1 Nov. 11, 2021

(30) Foreign Application Priority Data
Sep. 27, 2018 (JP) ................................ 2018-182047

(51) Int. Cl.
*B21D 19/08* (2006.01)
*F01N 13/18* (2010.01)
*F16L 23/032* (2006.01)

(52) U.S. Cl.
CPC ....... *B21D 19/082* (2013.01); *F01N 13/1855* (2013.01); *F01N 13/1872* (2013.01); *F16L 23/032* (2013.01); *F01N 2450/24* (2013.01)

(58) Field of Classification Search
CPC ........ B21D 5/16; B21D 19/046; B21D 19/06; B21D 19/082; B21D 19/088; B21D 19/10;
(Continued)

(56) References Cited

U.S. PATENT DOCUMENTS 893,434 A * 7/1908 Brinkman ............. F16L 23/032
285/368
2,963,197 A * 12/1960 Lyon, Jr. ................ B21D 19/12
220/574
(Continued)

FOREIGN PATENT DOCUMENTS

CN 207212458 U 4/2018
EP 2474722 A2 7/2012
(Continued)

OTHER PUBLICATIONS

KR 100893211B1, Kwon et al. Apr. 2009.*
(Continued)

*Primary Examiner* — Edward T Tolan
(74) *Attorney, Agent, or Firm* — BUCHANAN INGERSOLL & ROONEY PC

(57) ABSTRACT

After an annular plate is blanked from a metal flat plate in a blanking step, an inner peripheral portion of the annular plate is deformed upward in a burring step. As a result, a hat-shaped intermediate product having an upstanding tubular portion and an annular plate portion is formed. After that, an outer peripheral portion of the annular plate portion is folded step by step toward an inner peripheral side of the annular plate portion. As a result, a folded portion composed of a first folded portion and a second folded portion is formed, whereby a connection portion having a second flange portion is formed.

6 Claims, 3 Drawing Sheets

Third flange forming step

(58) Field of Classification Search
CPC ........ B21D 19/12; B21D 19/16; B21D 19/08; B21D 51/06; B21D 51/30; B21D 51/34; F16L 23/032
See application file for complete search history.

(56) References Cited

U.S. PATENT DOCUMENTS

| | | | |
|---|---|---|---|
| 2,999,312 A * | 9/1961 | Schilberg | B21D 19/08 72/348 |
| 3,179,449 A * | 4/1965 | Markisen | F16L 23/032 29/418 |
| 3,455,582 A | 7/1969 | Hoevel | |
| 5,908,352 A * | 6/1999 | Meester | A01D 46/28 460/145 |
| 2002/0067950 A1 | 6/2002 | Price et al. | |
| 2002/0094233 A1 | 7/2002 | Price et al. | |
| 2008/0191465 A1 | 8/2008 | Meinig | |
| 2012/0174560 A1 | 7/2012 | Schmitt et al. | |

FOREIGN PATENT DOCUMENTS

| | | |
|---|---|---|
| FR | 1360847 A | 4/1963 |
| JP | S56147987 A | 11/1981 |
| JP | S6192743 A | 5/1986 |
| JP | H0663820 U | 9/1994 |
| JP | H1094846 A | 4/1998 |
| JP | 2009-121528 A | 6/2009 |
| JP | 2017074614 A | 4/2017 |

OTHER PUBLICATIONS

KR 20110038829A, Kim Apr. 2011.*
JP 07-275980A, Oda et al. Oct. 1995.*
KR 100893211B1, Kwon et al. Apr. 2009.*
International Search Report (PCT/ISA/210) and Written Opinion (PCT/ISA/237) dated Nov. 25, 2019, by the European Patent Office as the International Searching Authority for International Application No. PCT/JP2019/036228.
Office Action (Examination report No. 1 for your standard patent application) dated Nov. 2021, by the Patent Office, Australian Government in corresponding Australian Patent Application No. 2019345494. (4 pages).
Office Action (The First Substantive Examination Result) dated Jan. 31, 2022, by the Indonesian Patent Office in corresponding Indonesian Patent Application No. P00202101647 and an English Translation of the Office Action. (6 pages).
Office Action (Examination Report) dated Jun. 30, 2021, by the Patent Office, Government of India, in corresponding India Patent Application No. 202117012163 with an English Translation of the Office Action. (5 pages).
Office Action (Notification of the First Office Action) dated Jul. 13, 2022, by the China National Intellectual Property Administration in corresponding Chinese Patent Application No. 201980059487.1 and an English Translation of the Office Action. (17 pages).

* cited by examiner

[Fig. 1]
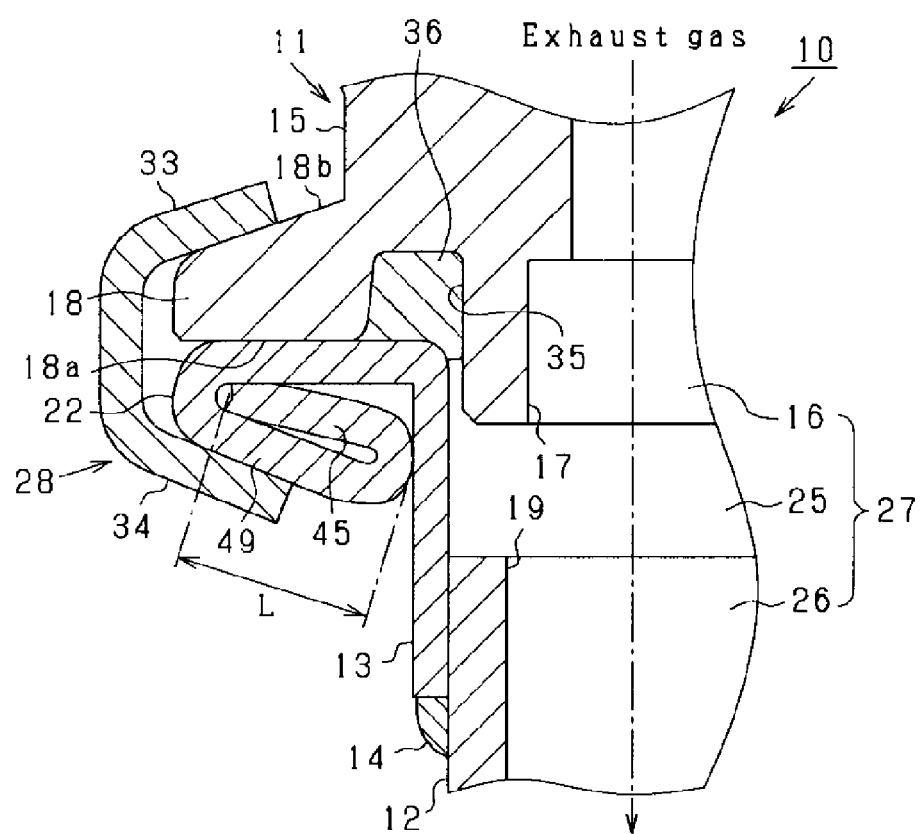

[Fig. 2]
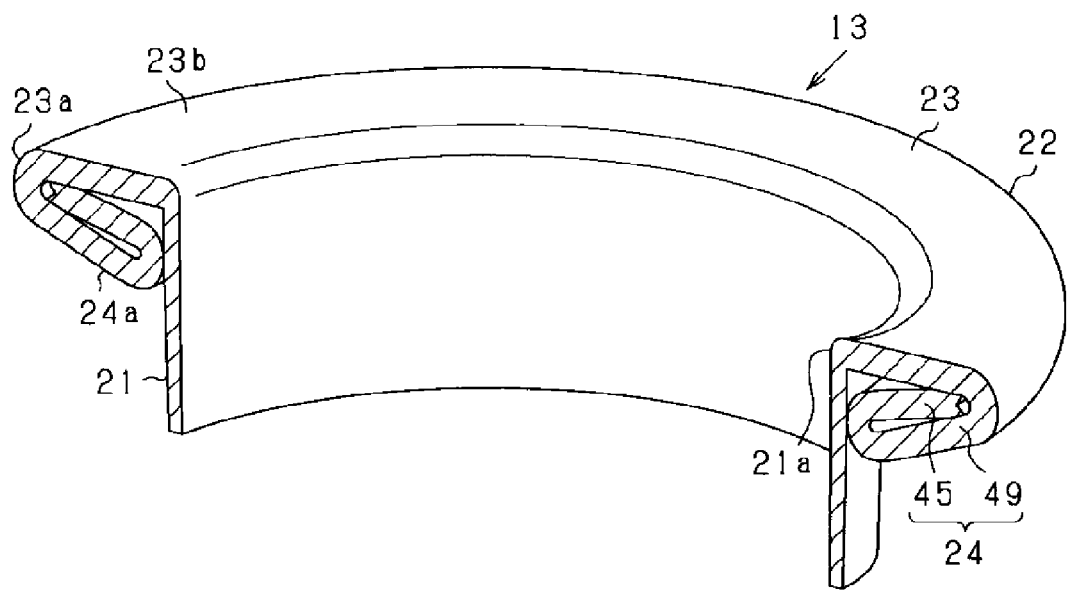
[Fig. 3]
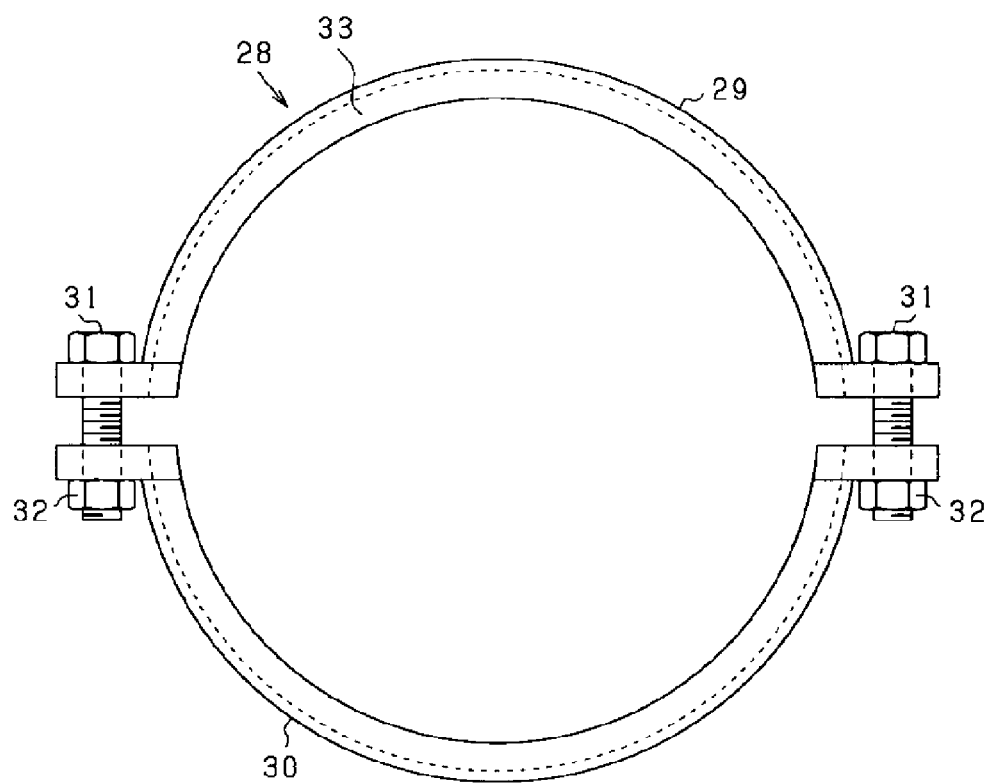

[Fig. 4A]
Blanking step
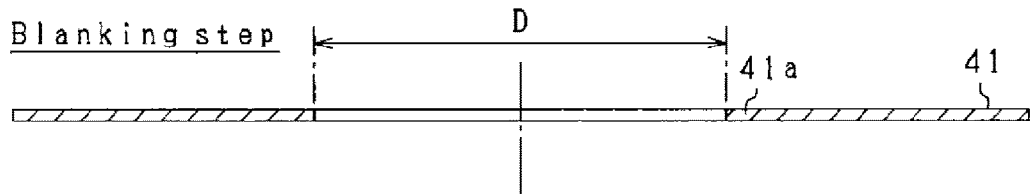
[Fig. 4B]
Burring step
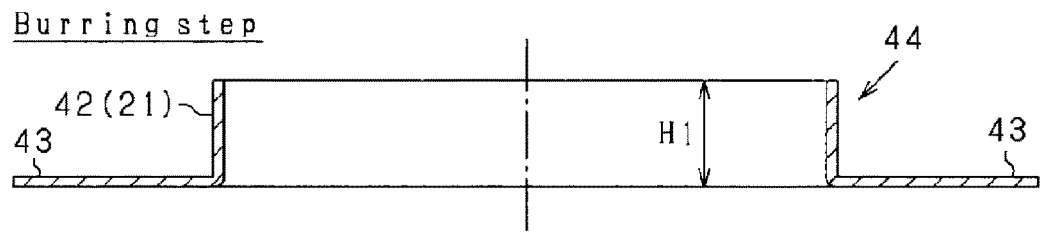
[Fig. 4C]
First flange forming step
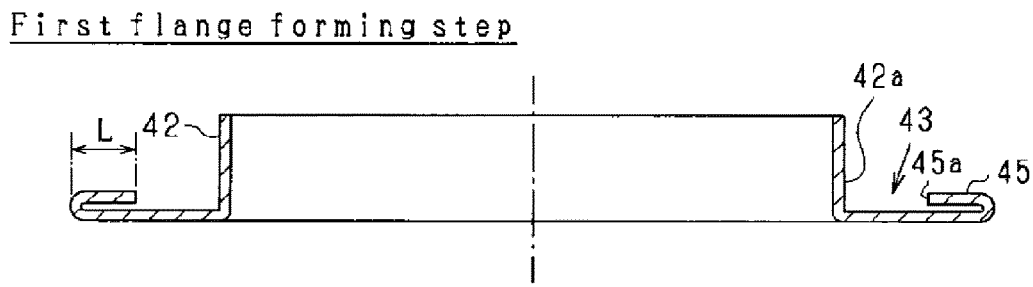
[Fig. 4D]
Second flange forming step
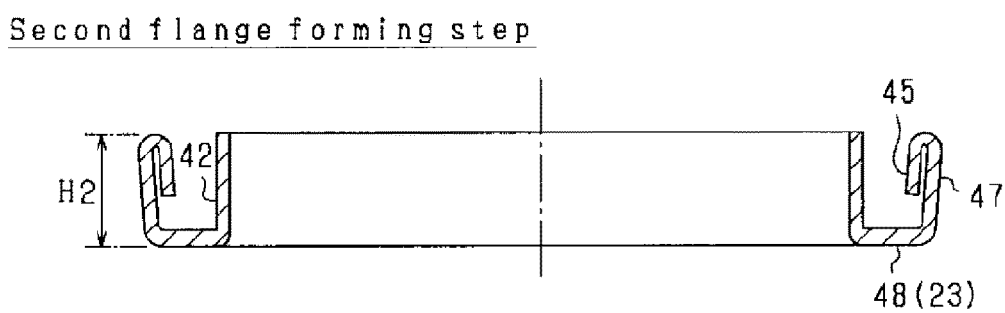
[Fig. 4E]
Third flange forming step
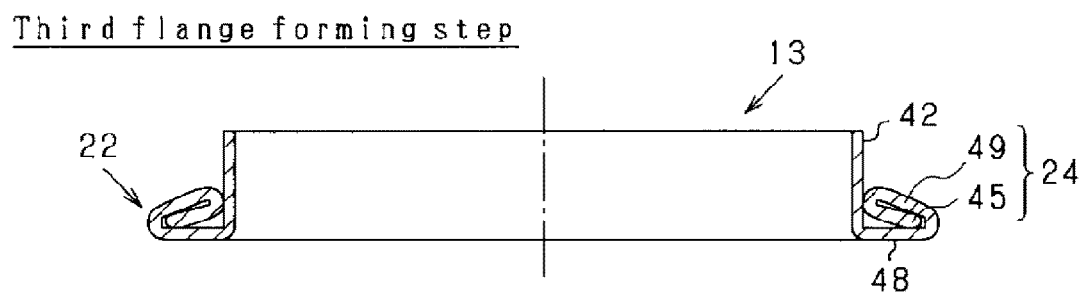

METHOD OF MANUFACTURING CONNECTION MEMBER

CROSS REFERENCE TO RELATED APPLICATION

This international patent application claims priority from Japanese Patent Application No. 2018-182047 filed with the Japanese Patent Office on Sep. 27, 2018, and the entire contents of Japanese Patent Application No. 2018-182047 are incorporated by reference in this international application.

TECHNICAL FIELD

The present disclosure relates to a method of manufacturing a connection member having a flange portion.

BACKGROUND ART

In a known connection structure for connecting a catalytic converter and a turbocharger applied to an internal combustion engine of a vehicle or the like, the turbine housing of the turbocharger is connected, through use of a clamp, to an upstream pipe portion disposed on the upstream side of the catalytic converter. In such a connection structure, a flange portion formed at a connection end of the turbine housing and a flange portion formed at a connection end of the upstream pipe portion are placed one on top of another, and the flange portions are held together tightly by the clamp so that the flange portions are connected together.

In the above-described connection structure, high-temperature exhaust gas discharged from the turbocharger is introduced into the catalytic converter through the upstream pipe portion. In order to prevent the exhaust gas from leaking from the boundary between the turbine housing and the upstream pipe portion, a high level of sealing performance must be secured between mating surfaces (connection surfaces) of the flange portions.

CITATION LIST

Patent Literature

[PTL 1]
Japanese Utility Model Application Laid-Open (kokai) No. H6-63820
[PTL 2]
Japanese Patent Application Laid-Open (kokai) No. 2017-74614

SUMMARY OF INVENTION

Technical Problem

Conventionally, it has been common practice to form the upstream pipe portion of the catalytic converter through casting. The person providing the present disclosure has considered that, for weight reduction, the upstream pipe portion can be formed from a metal pipe by forming a flange portion by bending an end portion of the metal pipe. Notably, for example, Patent Documents 1 and 2 disclose a technique of forming a flange portion by bending an end portion of a metal pipe, rather than employing a structure for fastening by a clamp.

In the case where a flange portion for connection is formed through use of a metal pipe, the following problem may arise. First, a welded pipe which is generally used as a metal pipe is manufactured as follows. A metal plate is rolled into a tubular shape such that opposite edges are butted against each other. Alternatively, a pair of semi-tubular metal members are combined such that opposite edges of one metal member are butted against opposite edges of the other metal member. Subsequently, the butted portions are welded, whereby a welded pipe is completed. In the case where an end portion of such a pipe in the longitudinal direction thereof is bent to form a flange portion, a step or_a bulge is formed as a result of welding on the surface of the flange portion. In such a case, the flatness of the connection surface deteriorates, and sealing performance may deteriorate.

A conceivable measure for preventing the flatness deterioration and the sealing performance deterioration is use of a seamless pipe (pipe having no seam) formed through drawing of steel or the like. However, such a pipe is expensive and increases production cost.

The above-described problem is not limited to the connection structure for connecting the turbine housing and the upstream pipe portion and may similarly occur in a connection structure in which two members having internal flow passages are connected together, by fastening their flange portions together by a clamp, such that the internal flow passages communicate with each other.

The present disclosure has been made in view of the above-described circumstances, and an object is to provide a method of manufacturing a connection member which can secure a high level of sealing performance while suppressing an increase in production cost.

Solution to Problem

One aspect of the present disclosure provides a method of manufacturing a connection member used for connecting two tubes, internal flow passages of the tubes communicating with each other, each tubes have a flange, the two tubes are connected together by clamping the flanges, the connection member has a tube body and a flange, and is provided in one or both of the tubes, the flange of the connecting member is the flange of the tube provided with the connecting member, the method comprises a blanking step of blanking a seamless annular plate from a flat plate, a burring step of performing burring on the annular plate blanked in the blanking step to form an annular plate portion and the tube body rising from an inner periphery of the annular plate portion and a flange forming step of forming the flange including at least one annular folded portion by folding the annular plate portion from an outer peripheral side of the annular plate portion toward an inner peripheral side of the annular plate portion.

According to this aspect, no step is formed on the connection surface, unlike the case where a flange is formed by bending an end portion of a welded pipe. Therefore, a high level of sealing performance can be secured at the connection boundary between the flanges. Also, since the connection member can be formed by using a common flat plate, it is unnecessary to use an expensive base material such as seamless pipe, whereby an increase in production cost can be suppressed.

In the flange forming step, the annular plate portion can be folded toward a side that the tube body protrudes.

According to this aspect, the folded portion is formed on the side opposite the connection surface. Therefore, the flatness of the connection surface can be easily secured, and sealing performance can be enhanced. Also, since a folded portion matching with the shape of a clamp is formed by adjusting the bending angle of the folded portion, a flange which enables satisfactory clamp fastening can be formed by a simple method. Namely, according to this aspect, the connection member which simultaneously realizes a high level of sealing performance and satisfactory fastening can be formed by a simple method.

In the flange forming step, the folding can be performed to form a plurality of folded portions.

According to this aspect, when the flanges are held together by the clamp, the flange of the connection member is prevented from easily or excessively deforming due to pressing forces from the clamp. As a result, the connection member in which the flanges are connected well can be formed.

The tube body has an inner diameter greater than an outer diameter of the tubes, when the inner diameter of the tube body is greater than the outer diameter of the tube, the tube and the tube body are fixed to each other in a state in which the tube is inserted into the tube body.

According to this aspect, the connection member is formed separately from the tubes. Therefore, as compared with the case where the connection member is formed integrally with the tubes, the length of the tube body of the connection member can be reduced. Therefore, when the tube body is formed in the burring step, the burring depth can be decreased, whereby the possibility of occurrence of damage to the annular plate, such as cracking, can be decreased. As a result, improvement of yield can be expected. Further, since setting of forming conditions and selection of the plate material become easier, production can be made easier.

Other objects, other features, and attendant advantages of the present disclosure will be readily appreciated from the following description which is made with reference to the accompanying drawings.

BRIEF DESCRIPTION OF DRAWINGS

FIG. 1 is a sectional view of a connection structure to which a connection member according to the present disclosure is applied.

FIG. 2 is a perspective sectional view of the connection member.

FIG. 3 is a plan view of a V clamp.

FIG. 4A is an explanatory view of a blanking step.

FIG. 4B is an explanatory view of a burring step.

FIG. 4C is an explanatory view of a first flange forming step.

FIG. 4D is an explanatory view of a second flange forming step.

FIG. 4E is an explanatory view of a third flange forming step.

FIG. 4A to 4E are a set of explanatory views used for describing a method of manufacturing the connection member.

DESCRIPTION OF EMBODIMENTS

One embodiment of the present disclosure will be described with reference to the drawings.

As shown in FIG. 1, in the connection structure 10, a turbine housing 11 of a turbocharger is connected through a connection member 13 to an upstream pipe portion 12 connected to an upstream end of a catalytic converter. The connection member 13 is fixed to the upstream pipe portion 12 by means of welding 14 and is integrated with the upstream pipe portion 12.

The turbine housing 11 houses a turbine wheel which rotates upon supply of exhaust gas from an engine. The turbine housing 11 is formed through casting. The turbine housing 11 has a coupling portion 15 (a first tubular portion) for joining the housing 11 to the upstream pipe portion 12 (the connection member 13).

The coupling portion 15 has an approximately cylindrical tubular shape and has a gas passage 16 formed therein. The exhaust gas passes through the gas passage 16 after having rotated the turbine wheel. The exhaust gas within the gas passage 16 is discharged to the outside of the turbine housing 11 through an outlet 17 provided at a downstream end of the gas passage 16, whereby the exhaust gas is led to the upstream pipe portion 12.

On the outlet 17 side of the coupling portion 15, a first flange portion 18 is provided on the outer periphery of the coupling portion 15. The first flange portion 18 is formed over the entire circumference of the coupling portion 15. The first flange portion 18 has a bottom surface 18a which is a flat surface extending outward in the radial direction of the coupling portion 15, and an upper surface 18b which is a sloping surface sloping down toward the outer side.

The upstream pipe portion 12 (a second tubular portion) has a cylindrical tubular shape and has an inlet 19 at its upstream end. The exhaust gas discharged from the turbine housing 11 flows into the upstream pipe portion 12 through the inlet 19. In the present embodiment, the upstream pipe portion 12 is formed by means of press forming for weight reduction.

The connection member 13 functions as a joint for connecting the upstream pipe portion 12 to the turbine housing 11. As shown in FIG. 2, the connection member 13 has a cylindrical tubular portion 21 which is open at its opposite ends. The tubular portion 21 has an inner diameter slightly greater than the outer diameter of the upstream pipe portion 12. When the connection member 13 is fixed to the upstream pipe portion 12, a portion of the upstream pipe portion 12 is inserted into the interior of the tubular portion 21 from its downstream-end-side opening, and an outer circumferential surface of the upstream pipe portion 12 and the tubular portion 21 are welded together in such a state.

The tubular portion 21 has a second flange portion 22 which is provided at an upstream end 21a thereof and extends over the entire circumference of the tubular portion 21. The second flange portion 22 has a protruding dimension corresponding to that of the first flange portion 18 of the turbine housing 11. Specifically, the protruding dimension of the second flange portion 22 is set such that, when the connection member 13 is attached to the turbine housing 11, the protruding position of the outer peripheral edge of the second flange portion 22 approximately coincides with that of the first flange portion 18 (see FIG. 1).

The second flange portion 22 has an extension portion 23 and a folded portion 24. The extension portion 23 extends outward from the upstream end 21a of the tubular portion 21 in the radial direction of the tubular portion 21. The folded portion 24 is formed as a result of inward bending at an outer peripheral edge 23a of the extension portion 23. The extension portion 23 has a flat surface 23b parallel to the bottom surface 18a of the first flange portion 18. The folded portion 24 has a sloping surface 24a sloping down toward the inner side. The folded portion 24 is formed as a result of two times folding and is composed of a first folded portion 45 and a second folded portion 49.

The connection member 13 is formed from a metal plate through press forming so that the above-mentioned tubular portion 21 and folded portion 24 are formed integrally. Notably, a method of manufacturing the connection member 13 will be described in detail later.

For a connection between the turbine housing 11 and the upstream pipe portion 12 (the connection member 13), first, the extension portion 23 (the surface 23b) of the second flange portion 22 is brought into contact with the bottom surface 18a of the first flange portion 18, whereby the connection member 13 is disposed in place in relation to the turbine housing 11. As a result, the gas passage 16 within the turbine housing 11, a space 25 within the tubular portion 21 of the connection member 13, and a gas passage 26 within the upstream pipe portion 12 communicate with one another, whereby a flow passage 27 is formed.

In such a state, a V clamp 28 is attached from the outer peripheral side in such a manner that the first flange portion 18 of the turbine housing 11 and the second flange portion 22 of the connection member 13 are held together tightly. As shown in FIG. 3, the V clamp 28 is composed of a pair of semi-circular clamp members 29 and 30 which are disposed to face each other. Opposite ends of the clamp member 29 are joined to opposite ends of the clamp member 30 by bolts 31 and nuts 32. Each of the clamp members 29 and 30 has an approximately V-shaped cross section. The sloping angles of sloping portions 33 and 34 (FIG. 1) approximately coincide with the sloping angles of the upper surface 18b of the first flange portion 18 and the folded portion 24 of the second flange portion 22, respectively.

When the nuts 32 are tightened in a state in which the V clamp 28 has been attached, pressing forces for causing the first flange portion 18 and the second flange portion 22 to approach each other are applied to the first flange portion 18 and the second flange portion 22, respectively, through the sloping portions 33 and 34 of the V clamp 28, whereby the two flange portions 18 and 22 are connected together.

The length L (FIG. 1) of the first folded portion 45 of the second flange portion 22 is determined such that, in a region between the two sloping portions 33 and 34 of the V clamp 28, a portion of the first folded portion 45 can be located between the extension portion 23 and the second folded portion 49. Namely, in the above-mentioned region, the second folded portion 49 receives the pressing force from the V clamp 28 in a state in which the first folded portion 45 intervenes between the second folded portion 49 and the extension portion 23.

Then, the rigidity of the second flange portion 22 at the time of clamp fastening is increased, whereby deformation of the second flange portion 22 can be suppressed. As a result, sufficient fastening force is produced. In addition, in the case of re-fastening after release of the clamp fastening for replacement, repair, etc. of the turbocharger, the connection member 13 can be used repeatedly without replacement.

The turbine housing 11 also has an annular recess 35 which is formed at the bottom of the coupling portion 15 and circumferentially surrounds the outlet 17. A gasket 36 serving as a seal is fitted into the recess 35. As a result, the sealing performance at the boundary between the turbine housing 11 and the connection member 13 is enhanced, whereby leakage of exhaust gas can be prevented appropriately. Notably, the above-mentioned annular recess 35 and gasket 36 may be omitted in the case where a sufficient level of sealing performance can be secured by the connection of the first flange portion 18 and the second flange portion 22.

Next, a method of manufacturing the connection member 13 will be described with reference to FIG. 4.

First, a flat plate formed of a metal and having neither seams nor steps (recesses and protrusions) is prepared. The material of the flat plate may be appropriately determined in consideration of, for example, an environment in which the above-described connection structure 10 is used. It is preferred that the material of the flat plate be a metal material, such as stainless steel, which is excellent in heat resistance, corrosion resistance, and formability.

Subsequently, the above-mentioned flat plate is set on a die for blanking, and, as shown in FIG. 4A, an annular plate 41 is formed by means of blanking (blanking step). In the present step, the blanking of the flat plate is performed such that the annular plate 41 has a circular shape. At that time, the inner diameter D of the annular plate 41 is made smaller than the inner diameter of the tubular portion 21 (FIG. 2) of the connection member 13.

Next, as shown in FIG. 4B, an upstanding tubular portion 42 is formed along the inner periphery side of the annular plate (burring step). In this step, a punch having a diameter greater than the above-mentioned inner diameter D is pushed into the inner periphery portion 41a of the annular plate 41 from the lower side of the annular plate 41 so as to upwardly deform an inner peripheral portion 41a of the annular plate 41, whereby the upstanding tubular portion 42 is formed. As a result, a hat-shaped intermediate product 44 having an annular plate portion (flange portion) 43 is formed. The upstanding tubular portion 42 becomes the tubular portion 21 in the completed state of the connection member 13 and its height H1 (burring depth) is set in accordance with the length that the tubular portion 21 must have.

Next, as shown in FIG. 4C, the intermediate product 44 formed in the above-described burring step is subjected to hemming, whereby the first folded portion 45 is formed (first flange forming step). In this step, the first folded portion 45 is formed by folding, in the side toward which the upstanding tubular portion 42 protrudes, an outer peripheral portion of the annular plate portion 43 toward the inner periphery side.

After that, as shown in FIG. 4D, an outer peripheral portion of the annular plate portion 43 having the first folded portion 45 formed thereon is deformed upward, whereby an upright portion 47 is formed (second flange forming step). In this step, a part of the annular plate portion 43, which part includes the first folded portion 45, is bent upward, while an intermediate position between the outer circumferential surface 42a (see FIG. 4C) of the upstanding tubular portion 42 and a distal end 45a of the first folded portion 45 is used as a bending point. As a result, the upright portion 47 is formed to have a height H2 greater than the length L of the first folded portion 45. Also, a flat portion 48 is formed between the upstanding tubular portion 42 and the upright portion 47. The flat portion 48 becomes the extension portion 23 in the completed state of the connection member 13.

Next, as shown in FIG. 4E, the upright portion 47 is further bent toward the upstanding tubular portion 42 so as to form the second folded portion 49 (third flange forming step). At that time, the bending angle of the second folded portion 49 is set such that the sloping surface 24a (see FIG. 2) is formed. As a result, the second flange portion 22 is formed, and the connection member 13 is completed.

The present embodiment described in detail above yields the following excellent effects.

After blanking the annular plate 41 from a flat plate, the upstanding tubular portion 42 is formed on the annular plate 41 by means of burring. After that, steps such as a step of folding an outer peripheral portion of the annular plate 41 toward the inner periphery side are performed, whereby the connection member 13 having the second flange portion 22 is formed.

When this connection member 13 is used, no step is formed on the connection surface of the second flange portion 22 through which the second flange portion 22 is connected to the first flange portion 18 (the turbine housing 11), and a high level of sealing performance can be secured at the connection boundary between the two flange portions 18 and 22. Also, since the connection member 13 can be formed through use of a common metal flat plate, an expensive base metal is not used, and therefore, an increase in production cost can be suppressed.

In each flange forming step, an outer peripheral edge portion of the annular plate 41 is folded toward the side toward which the upstanding tubular portion 42 protrudes, whereby the folded portion 24 is formed.

For example, if the above-mentioned outer peripheral edge portion is folded toward the side opposite the side toward which the upstanding tubular portion 42 protrudes, the folded portion constitutes a connection surface to be connected with the first flange portion 18. In such a structure, the flatness of the connection surface and the parallelism of the connection surface with respect to the connection surface (the bottom surface 18a) of the first flange portion 18 deteriorate, which may result in deterioration of sealing performance. Also, at the time of connection with the turbine housing 11, the V clamp 28 comes into contact with a part of the annular plate portion 43 on the side opposite the folded portion. Therefore, the annular plate portion 43 must be machined such that the part slopes.

In contrast, in the present embodiment, since the folded portion 24 is formed on the side opposite the connection surface, the flatness of the connection surface can be secured easily, and sealing performance can be enhanced. Also, since the sloping surface 24a can be formed by adjusting the bending angle of the folded portion 24, the second flange portion 22 having a shape matching with the V clamp 28 can be formed simply. Namely, by virtue of the present structure, the connection member 13 which simultaneously realizes a high level of sealing performance and satisfactory fastening can be formed by a simple method.

In each flange forming step, the annular plate portion 43 is folded two times, thereby forming the folded portion 24 such that the first folded portion 45 intervenes between the flat portion 48 and the second folded portion 49.

In this case, when the first flange portion 18 and the second flange portion 22 are held together tightly by the V clamp 28, the second flange portion 22 is prevented from easily or excessively deforming. As a result, the first flange portion 18 and the second flange portion 22 can be connected well.

Notably, in the above-described embodiment, the number of times of folding is two. The number of times of folding is not limited to two, and may be increased to three times or more in accordance with, for example, the thickness of the flat plate.

OTHER EMBODIMENTS

The present disclosure is not limited to the above-described embodiment, and the following embodiments are possible.

(1) In the above-described embodiment, the connection member 13 is applied to the connection between the turbine housing 11 and the upstream pipe portion 12. The present disclosure is not limited thereto and can be applied to any connection structure in which first and second tubular portions having internal flow passages are disposed in such a manner that the internal flow passages communicate with each other and a first flange portion provided on the first tubular portion and a second flange portion provided on the second tubular portion are fastened together by a clamp.

(2) In the above-described embodiment, a seamless flat plate is used. The plate used to form the annular plate 41 is not limited to the seamless flat plate and may be any plate, so long as at least the annular plate 41 formed by the blanking step has no seam.

(3) In the above-described embodiment, the connection member 13 and the upstream pipe portion 12 are formed separately. The two portions may be formed integrally as a single body. Such a structure can be realized by increasing the amount of vertical deformation in the burring step as compared with that in the case shown in FIG. 4B, thereby increasing the height H1 of the upstanding tubular portion 42. Such burring (deep drawing) may increase the load acting on the annular plate 41, thereby increasing the possibility of generation of a crack or the like in the annular plate 41. As a result, yield may drop, or setting of forming conditions and material selection may become difficult. In view of this, it is preferred to form the connection member 13 and the upstream pipe portion 12 as separate members.

(4) In the above-described embodiment, the first flange portion 18 is formed by means of casting. Instead, the first flange portion 18 may be formed through forming of a metal flat plate. Namely, there may be employed a structure in which a pair of connection member 13 similar in structure are disposed to face each other, and the flange portions of the connection member 13 are held together tightly by the V clamp 28, whereby the two flange portions are connected.

(5) In the above-described embodiment, the inner diameter of the tubular portion 21 of the connection member 13 (the upstanding tubular portion 42) is rendered larger than the outer diameter of the upstream pipe portion 12, a portion of the upstream pipe portion 12 is inserted into the tubular portion 21, and the upstream pipe portion 12 and the tubular portion 21 are welded together. Instead, the outer diameter of the tubular portion 21 may be rendered smaller than the inner diameter of the upstream pipe portion 12. In this case, a portion of the tubular portion 21 is inserted into the upstream pipe portion 12, and the tubular portion 21 and the upstream pipe portion 12 are welded together.

The present disclosure has been described in conformity with the embodiments, but is not limited to the embodiments and the structures therein. Further, the present disclosure encompasses various modified embodiments, and modifications in the scope of equivalents of the present disclosure. In addition, various combinations and forms, and even other combinations and forms to which only one element or two or more elements are added fall within the scope and the range of ideas of the present disclosure.

REFERENCE SIGNS LIST 10 connection structure
12 upstream pipe portion (second tubular portion)
13 connection member
15 coupling portion (first tubular portion)
18 first flange portion
22 second flange portion
24 folded portion
27 flow passage
41 annular plate
42 upstanding tubular portion
43 annular plate portion.

The invention claimed is:

1. A method of manufacturing a pipe connector for connecting a first pipe including a first flange to a second pipe to which the pipe connector is fixed, the pipe connector including a second flange to be fastened together with the first flange with a clamp, the method comprising:

blanking a metal flat plate in a circular shape with a center hole to form an annular plate;

bending an inner periphery of the annular plate around the center hole upward to form an upstanding tubular portion;

folding an outer peripheral portion of the annular plate until an outer edge of the outer peripheral portion is opposed to and spaced from an outer circumferential surface of the upstanding tubular portion to form a folded portion;

bending a portion of the annular plate between the outer edge of the outer peripheral portion and the outer circumferential surface of the upstanding tubular portion until an outer surface of the folded portion is opposed to and spaced from the outer circumferential surface of the upstanding tubular portion to define an upright portion and a flat portion; and tilting the upright portion until an outer edge of the folded portion contacts the outer circumferential surface of the upstanding tubular portion to form the second flange including the flat portion.

2. The method according to claim 1, wherein the upstanding tubular portion has an inner diameter greater than an outer diameter of the second pipe to be fitted on the second pipe.

3. The method according to claim 1, wherein the upright portion is tilted until a portion of the outer surface of the folded portion contacts an inner surface of the flat portion.

4. The method according to claim 1, wherein
the flat portion of the second flange includes a contact surface to be contact with an outer surface of a flat portion of the first flange, and
the contact surface has an area greater than an area of the outer surface of the flat portion of the first flange.

5. The method according to claim 1, wherein the folded portion has a dimension in a radial direction of the pipe connector less than a height of the upstanding tubular portion.

6. The method according to claim 5, wherein the upright portion has a height greater than the height of the upstanding tubular portion.

* * * * *